(12) United States Patent
Shah et al.

(10) Patent No.: US 11,483,249 B2
(45) Date of Patent: Oct. 25, 2022

(54) SYSTEMS AND METHODS FOR DYNAMIC OPTIMIZATION OF NETWORK CONGESTION CONTROL

(71) Applicant: Verizon Digital Media Services Inc., Dulles, VA (US)

(72) Inventors: Anant Shah, Los Angeles, CA (US); David Seddon, Los Angeles, CA (US); Sergio Leonardo Ruiz, Redondo Beach, CA (US); Joseph Korkames, Los Angeles, CA (US)

(73) Assignee: Edgecast Inc., Dulles, VA (US)

( * ) Notice: Subject to any disclaimer, the term of this patent is extended or adjusted under 35 U.S.C. 154(b) by 89 days.

(21) Appl. No.: 17/036,252

(22) Filed: Sep. 29, 2020

(65) Prior Publication Data

US 2022/0103483 A1   Mar. 31, 2022

(51) Int. Cl.
*H04L 12/851* (2013.01)
*H04L 12/801* (2013.01)
*H04L 47/2441* (2022.01)
*H04L 47/19* (2022.01)

(52) U.S. Cl.
CPC .......... *H04L 47/2441* (2013.01); *H04L 47/19* (2013.01)

(58) Field of Classification Search
CPC ............................ H04L 47/2441; H04L 47/19
See application file for complete search history.

(56) References Cited

U.S. PATENT DOCUMENTS

| | | | | |
|---|---|---|---|---|
| 2008/0144504 A1* | 6/2008 | Marcondes | ............. | H04L 47/10 370/252 |
| 2008/0239948 A1* | 10/2008 | Bai | ......................... | H04L 47/14 370/230 |
| 2010/0318675 A1* | 12/2010 | Nassor | .................... | H04L 47/19 709/235 |
| 2011/0299399 A1* | 12/2011 | Egan | ....................... | H04L 47/10 370/237 |
| 2013/0124753 A1* | 5/2013 | Ansari | .................... | H04L 47/30 709/235 |
| 2015/0078160 A1* | 3/2015 | Rankin | ................. | H04L 47/193 370/231 |
| 2017/0244643 A1* | 8/2017 | Lawrence | ............... | H04L 47/28 |
| 2017/0264546 A1* | 9/2017 | Agarwal | ................. | H04L 47/12 |
| 2017/0289838 A1* | 10/2017 | Agrawal | ........... | H04W 28/0273 |

(Continued)

*Primary Examiner* — Huy D Vu
*Assistant Examiner* — Bailor C Hsu
(74) *Attorney, Agent, or Firm* — Ansari Katiraei LLP; Arman Katiraei; Sadiq Ansari (57) ABSTRACT

An adaptive congestion control device ("ACCD") may dynamically optimize network congestion control for different active flows. The ACCD may initiate a first flow that is associated with a first set of flow parameters, may select a first congestion control algorithm from a plurality of congestion control algorithms based on the first set of parameters, and may control transmission of packets for the first flow according to the first congestion control algorithm. While the first flow is active, the ACCD may initiate a second flow that is associated with a different second set of flow parameters, may select a different second congestion control algorithm from the plurality of available congestion control algorithms based on the second set of parameters, and may control transmission of packets for the second flow according to the second congestion control algorithm.

20 Claims, 7 Drawing Sheets

(56) References Cited

U.S. PATENT DOCUMENTS

| | | | | |
|---|---|---|---|---|
| 2017/0366650 A1* | 12/2017 | Zhu | ........................ | H04L 69/16 |
| 2019/0140952 A1* | 5/2019 | Torres | ..................... | H04L 47/10 |
| 2019/0150027 A1* | 5/2019 | Ner | ................... | H04W 28/0231 |
| | | | | 370/235 |
| 2019/0182170 A1* | 6/2019 | Kulkarni | ................. | H04L 47/11 |

* cited by examiner

SYSTEMS AND METHODS FOR DYNAMIC OPTIMIZATION OF NETWORK CONGESTION CONTROL

BACKGROUND

Network congestion control may be used to avoid overwhelming a network link to the point of that network response times are adversely affected or packet loss occurs. The Transmission Control Protocol ("TCP") is one protocol that may be used to reliably transmit data packets over a data network. Each TCP implementation features a congestion control algorithm that provides a one-size-fits-all solution to congestion avoidance on the network. Specifically, a sending device with a particular TCP implementation may use the same congestion control algorithm for transmission of different types of content, for sending data packets to different receiving devices, and/or for network links exhibiting different performance. This one-size-fits-all solution may result in widely varying content delivery performance from the same sending device.

DETAILED DESCRIPTION OF PREFERRED EMBODIMENTS

The following detailed description refers to the accompanying drawings. The same reference numbers in different drawings may identify the same or similar elements.

Systems and methods, as described herein, provide dynamic optimization of network congestion control. The dynamic optimization may include selecting between different congestion control algorithms, and applying different tuning and/or customizations to the selected congestion control algorithms for different flows based on changing flow parameters. The flow parameters may include characteristics of the content that is requested for a flow, the receiving device involved in the flow, and/or the network link used for a flow. In some embodiments, a flow may correspond to a connection, session, or other network exchange or communication between two devices.

In some embodiments, the dynamic optimization of network congestion control may be implemented by an adaptive congestion control device ("ACCD"). The ACCD may include any network-connected content delivery device (e.g., a server). The ACCD may be a standalone device or a device that operates as part of a distributed platform, such as a Content Delivery Network ("CDN") with a distributed set of servers.

The ACCD may switch between Binary Increase Congestion ("BIC"), CUBIC, Bottleneck Bandwidth and Round-trip propagation time ("BBR"), Reno, Tahoe, and/or other congestion control algorithms of Transmission Control Protocol ("TCP") and/or other network protocols for different concurrent or independent flows that terminate at and/or are transmitted from the ACCD. The ACCD may also customize parameters of a selected congestion control algorithm to modify behavior of the selected congestion control algorithm for different flows that terminate at and/or are transmitted from the ACCD. For instance, the ACCD may set and/or use different initial congestion window sizes to configure a congestion control algorithm differently for different flows.

In some embodiments, the ACCD switches between the different congestion control algorithms and customizes the selected congestion control algorithms in order to arrive at a selected and customized congestion control implementation that provides improved content delivery performance (e.g., less packet loss, lower total transmission time for the requested content, etc.) for a particular flow relative to other congestion control implementations or customizations supported by the ACCD. Accordingly, the ACCD may adjust congestion control on a per flow or per request basis to provide different congestion control that is optimized differently based on the parameters associated with each active flow between the ACCD and different destination devices or the same destination device.

Figure 1:
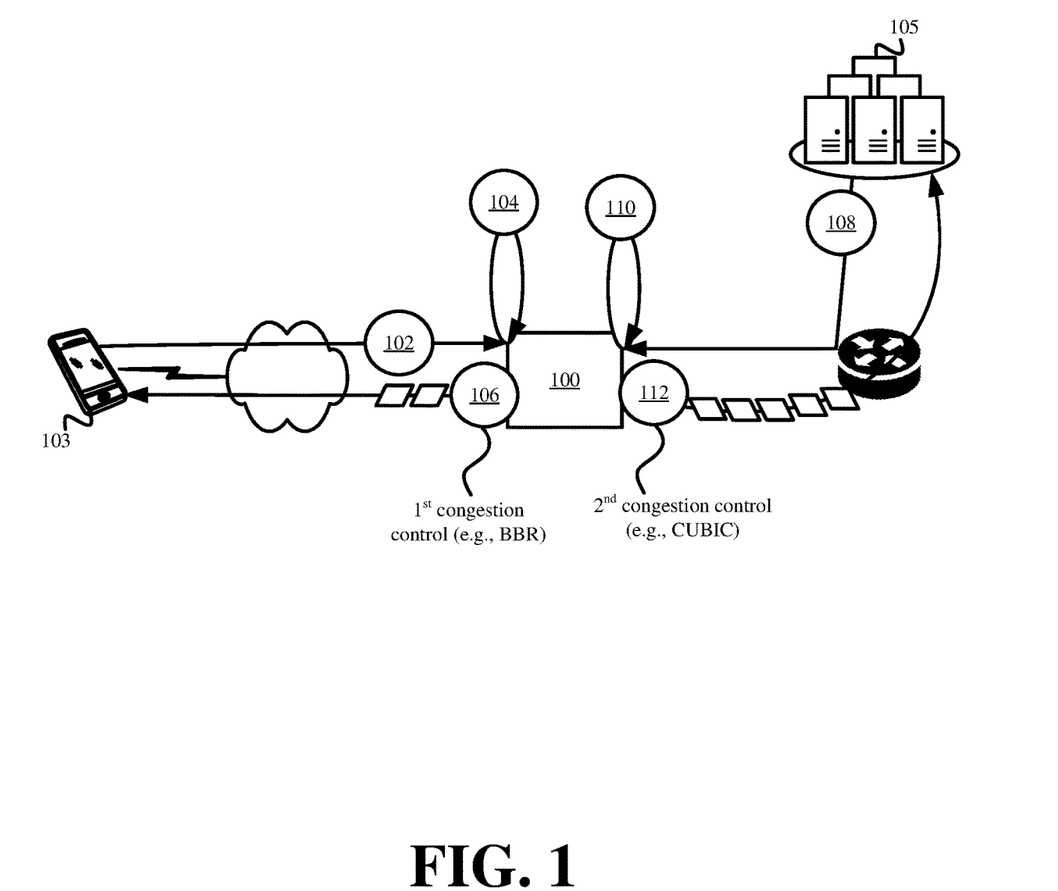
FIG. 1 illustrates an example of using different congestion controls for different active flows in accordance with some embodiments presented herein.

FIG. 1 illustrates an example of ACCD 100 using different congestion controls for different active flows in accordance with some embodiments presented herein. As shown in FIG. 1, ACCD 100 may establish a first network connection with first destination device 103, and may establish a second network connection with second destination device 105. The first and second network connections may correspond to TCP connections, Transport Layer Security ("TLS") connections, and/or connections of other protocols that support congestion control and/or flow control (e.g., Real-time Transport Protocol ("RTP"), Session Initiation Protocol ("SIP"), etc.). The term "connection" may interchangeably refer to a session, context, and/or other communication or data exchange between two devices over a network.

First destination device 103 may correspond to user equipment ("UE") that obtains network access from a wireless network carrier via an air interface provided by a Radio Access Network ("RAN") of the wireless network carrier. Accordingly, the first network connection used for communications between ACCD 100 and first destination device 103 may include a high latency, high packet loss, and/or low bandwidth network link.

The second network connection used for communications between ACCD 100 and second destination device 105 may traverse a low latency, low packet loss, and/or high bandwidth network link. In some embodiments, second destination device 105 may include a very well-connected data center that is part of the same distributed platform as ACCD 100. Accordingly, the first network connection may be a high latency connection with a large round-trip time ("RTT"), and may experience a large number of retransmits relative to the second network connection.

First destination device 103 may request (at 102) first content as part of a first flow between first destination device 103 and ACCD 100. The request may be issued as a HyperText Transfer Protocol ("HTTP") GET message or any other application layer protocol request message, may include header fields that identify various parameters of first destination device 103 (e.g., user agent, browser application issuing the request, network addressing, etc.) and/or the first network connection, and may include a Uniform Resource Locator ("URL") that identifies the first content that is the subject of the request. In some embodiments, the URL may include one or more parameters of the requested first content, such as the content type, content originator, etc.

ACCD 100 may inspect (at 104) parameters associated with the first flow. The parameters associated with the first flow (also referred to as the "first flow parameters") may be obtained from the request header, in the first connection establishment messaging, and/or external data sources (e.g., a network component providing subscriber information or a profile for first destination device 103). As noted above, the first flow parameters may identify first destination device 103, the requested first content, and/or properties of the first network connection and/or network link connecting ACCD 100 to first destination device 103. For instance, the parameters identifying first destination device 103 may include the user agent, browser or application used by first destination device 103, network address and/or hostname of first destination device 103, and/or other client identifying data. The parameters identifying the requested first content may include the file type (e.g., extension) for the first content, first content size, URL, message protocol or type used in requesting the first content, and/or other content identifying data. The parameters identifying the network link may include the Autonomous System ("AS") number, network address, address subnet, performance metrics for the network link (e.g., latency, RTT, packet loss, jitter, existing congestion, number of hops, etc.), traversed network(s), network connection type (e.g., wireless network carrier, low latency and high bandwidth network, etc.), and/or other network link identifying data.

ACCD 100 may select a first congestion control algorithm from a plurality of available congestion control algorithms based on the first flow parameters, and may use (at 106) the first congestion control algorithm to control the first flow. In particular, ACCD 100 may regulate the transmission of data packets, that encode the first content, to first destination device 103 according to the first congestion control algorithm. The first congestion control algorithm may correspond to a delay-based congestion control implementation (e.g., BBR) as congestion control benchmarking has demonstrated that a delay-based congestion control implementation may provide a 6-8% increase in throughput over a loss-based congestion control implementation (e.g., CUBIC) for wireless client devices that communicate over an air interface or wireless network link with larger latency, RTT, and retransmits than client devices communicating over a wired broadband link.

FIG. 1 also illustrates ACCD 100 receiving (at 108) a second request for second content as part of a different second flow between ACCD 100 and second destination device 105. Second destination device 105 may provide the second request, and/or the second flow may take place over the established second network connection. ACCD 100 may receive (at 108) the second request while responding to the first request, or while the first flow between ACCD 100 and first destination device 103 is active.

ACCD 100 may inspect (at 110) the parameters associated with the second flow. ACCD 100 may select a different second congestion control algorithm from the plurality of available congestion control algorithms based on the second flow parameters, and based on the second flow parameters differing from the first flow parameters. In some embodiments, the second congestion control algorithm may correspond to a loss-based congestion control implementation (e.g., CUBIC), wherein the loss-based congestion control implementation may provide better content delivery performance over a wired broadband link with low latency, high reliability, and high bandwidth than a delay-based congestion control implementation (e.g., the first congestion control algorithm).

ACCD 100 may use (at 112) the second congestion control algorithm to control the second flow by regulating the transmission of data packets, that encode the second content, to second destination device 105. As a result of using (at 106 and 112) the different congestion control algorithms for the different active flows, ACCD 100 may transmit the data packets for each flow differently. For instance, ACCD 100 may send a different number of unacknowledged data packets for each flow due to different congestion windows or operational behavior of the first and second congestion control algorithms used by ACCD 100 for the different flows. Similarly, each congestion control algorithm may decrease the number of unacknowledged data packets or the transmission rate by a different amount or at different times in response to detecting congestion on a corresponding network link, or may increase the number of acknowledged data packets or transmission rate by a different amount or at different times when no congestion is detected on a corresponding network link.

It should be noted that the difference in the transmission of data packets for the first flow and the second flow may occur even when the conditions of the first network link and first network connection between ACCD 100 and first destination device 103 are the same as or similar to the conditions of the second network link and second network connection between ACCD 100 and second destination device 105. In other words, the different congestion control algorithms may transmit data packets at different rates, with different numbers of unacknowledged packets, and/or other transmission differences in response to detecting the same or different amounts of congestion on the network links.

Figure 2:
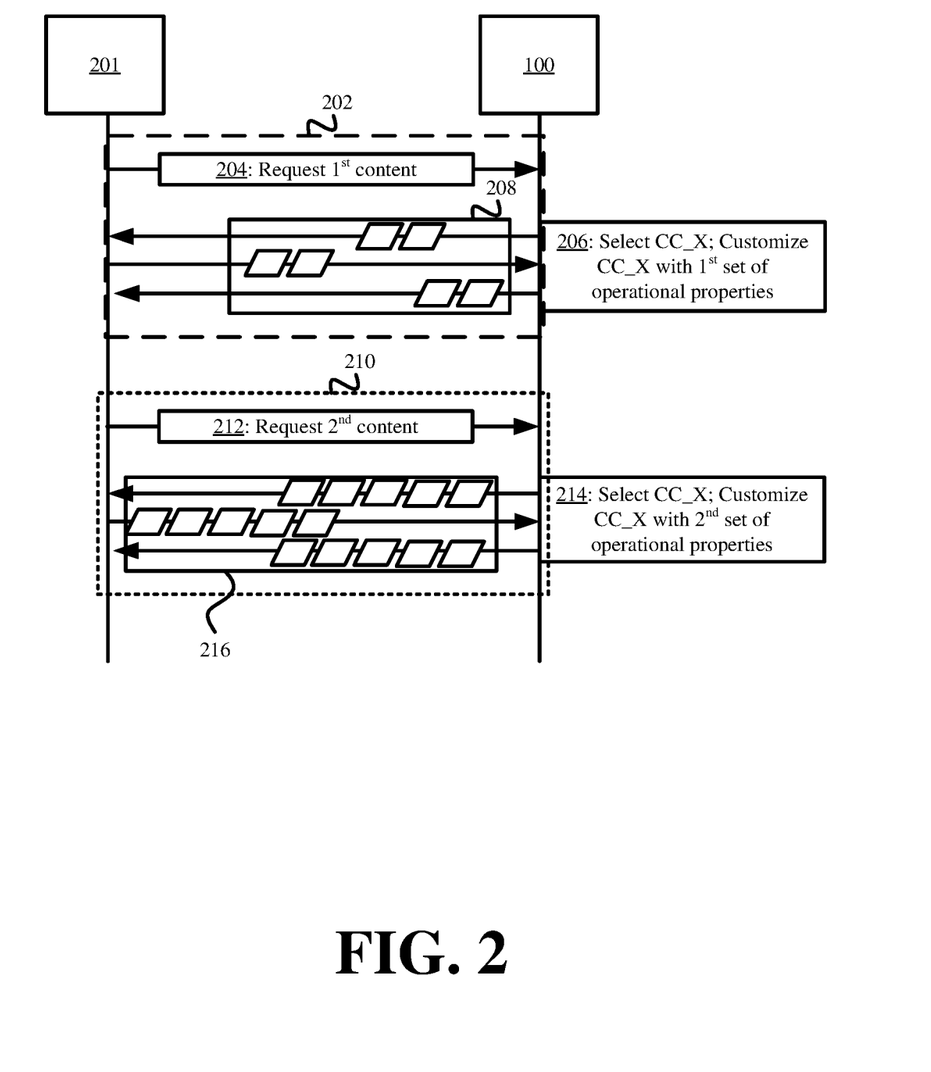
FIG. 2 illustrates an example of customizing a particular congestion control implementation differently for different active flows in accordance with some embodiments presented herein.

FIG. 2 illustrates an example of ACCD 100 customizing a particular congestion control implementation differently for different active flows in accordance with some embodiments presented herein. As shown in FIG. 2, client device 201 may establish (at 202) a first network connection with ACCD 100, and ACCD 100 may receive (at 204) a first request for first content as part of a first flow between ACCD 100 and client device 201 over the first network connection.

In some embodiments, ACCD 100 may obtain one or more flow parameters when establishing (at 202) the first network connection via the connection establishment messaging, and prior to receiving (at 204) the first request. For instance, during establishment of a TLS connection, client device 201 may provide a Client Hello message that includes a list of cipher suites support by client device 210 and/or other information from which a TLS fingerprint may be determined. In some embodiments, the list of cipher suites and the TLS fingerprint may provide various characteristics and/or identifying information about client device 210 that ACCD 100 may, partially or wholly, base the congestion control selection and/or customization on even before receiving an application layer request from client device 210.

ACCD 100 may inspect the first flow parameters from the connection establishment messaging (e.g., supported cipher suites in Client Hello connection establishment message) and/or request messaging (e.g., user agent, content type, etc.), and may select (at 206) a particular congestion control algorithm for the first flow based on the first flow parameters, wherein the first flow parameters may provide identifying characteristics of client device 201, the requested first content, and/or the network link over which ACCD 100 and client device 201 communicate. Selecting (at 206) the particular congestion control algorithm may include customizing operational properties of the particular congestion control algorithm based on the first flow parameters. In this example, ACCD 100 may configure the particular congestion control algorithm to operate according to a first set of operational properties.

The operational properties may adjust operational behavior of the particular congestion control algorithm. For instance, ACCD 100 may customize the starting or initial window size of the particular congestion control algorithm, may customize the minimum or maximum window size permitted for the flow, may customize the particular congestion control algorithm to operate at some scaler value of the estimated bandwidth of the network link, may adjust the rate at which the particular congestion control algorithm increases or decreases the window size in response to detected congestion or no congestion, etc. ACCD 100 may control the first flow and/or provide (at 208) data packets for the first content to client device 201 according to the particular congestion control algorithm customized with the first set of operational properties.

ACCD 100 may establish (at 210) a second network connection with client device 201, and may receive (at 212) a second request for second content as part of a second flow between ACCD 100 and client device 201. In some embodiments, client device 201 may reuse the first network connection to initiate the second flow by sending (at 212) the second request to ACCD 100.

In response to establishing (at 210) the second network connection and/or receiving (at 212) the second request, ACCD 100 may inspect the second flow parameters. ACCD 100 may select (at 214) the same particular congestion control algorithm, that was used for the first flow, based on the second flow parameters. However, ACCD 100 may configure and/or customize the particular congestion control algorithm differently for the second flow than for the first flow because of differences in the parameters for the requested second content and the requested first content, even though the first and second flows may traverse the same network link, and the same client device 201 may initiate the first and second flows.

Accordingly, selecting (at 214) the particular congestion control algorithm for the second flow may include customizing operational properties of the particular congestion control algorithm with a second set of operational properties, that are different than the first set of operational properties used for congestion control of the first flow, based on the second flow parameters. For instance, if the file size of the first content is greater than a threshold value, ACCD 100 may set a first window size for the particular congestion control algorithm used for the first flow, whereas if the file size of the second content is less than the threshold value, ACCD 100 may set a larger second window size for the particular congestion control algorithm used for the second flow so that all packets for the second content may delivered in fewer blasts and/or RTTs.

ACCD 100 may control the second flow and/or provide (at 216) data packets for the second content to client device 201 according to the particular congestion control algorithm customized with the second set of operational properties. Consequently, the rate and/or number of unacknowledged packets that ACCD 100 sends to client device 201 for the first flow may differ from the rate and/or number of unacknowledged packets that ACCD 100 sends to client device 201 for the second flow. Similarly, ACCD 100 may implement different changes to the transmission of the first flow and the second flow upon detecting congestion on the particular network link between ACCD 100 and client device 201 based on the different customizations made to the particular congestion control algorithm for the first flow and the second flow. For instance, in response to detecting congestion, ACCD 100 may decrease the window size for the first flow by 50% based on the first set of operational properties used to configure the congestion control for the first flow, and may decrease the window size for the second flow by 25% based on the second set of operational properties used to configure the congestion control for the second flow. The different congestion control behavior may allow for earlier completion of the second flow when the second content is significantly smaller in size (e.g., less than 10 megabytes ("MB")) than the first content for the first flow (e.g., greater than 100 MB).

In some embodiments, the first flow and the second flow may be active at the same time or during overlapping periods of time. Accordingly, ACCD 100 may provide different congestion control for different active flows over the same or different network links based on the different operational properties used to customize the congestion control differently for each flow.

ACCD 100 may modify the congestion control selection and/or customization for the same flow based on a continual monitoring and/or benchmarking of the plurality of available congestion control algorithms, and/or different customizations for each available congestion control algorithm. Consequently, ACCD 100 may not statically select the same congestion control algorithm or the same customization for a particular congestion control algorithm when the same client device requests content, the same content is requested, and/or the same network link is used. ACCD 100 may vary the selection and/or customization to account for changing parameters when detecting one or more of the same flow parameters.

For example, the same client may request the same content via the same network link at two different times. ACCD 100 may determine that a first congestion control algorithm and/or first set of operational properties used in providing data packets to the client after the first request does not satisfy a performance threshold. Rather than reselect the first congestion control algorithm and/or customize congestion control using the first set of operational properties to send the data packets to the client in response to the second request, ACCD 100 may analyze the congestion control benchmarks to select a better performing or next-best performing second congestion control algorithm and/or second set of operational properties to control the transmission of the data packets in response to the second request.

As another example, ACCD 100 may provide data packets for a first flow to a particular client. For the first flow, ACCD 100 may use a congestion control slow start implementation to transition from a default or initial window size to an optimal window size for the first flow based on congestion encountered on the network link while serving the data packets to the particular client. ACCD 100 may record the optimal window size in conjunction with one or more parameters for the first flow.

At a later time, the particular client may initiate a second flow to request the same or different content from ACCD 100 over the same network link. ACCD 100 may determine that the one or more second flow parameters match one or more of the first flow parameters. ACCD 100 may then customize a selected congestion control algorithm for the second flow with a different set of operational properties that include starting the window size at the recorded optimal window size rather than the slow start default or initial window size.

Figure 3:
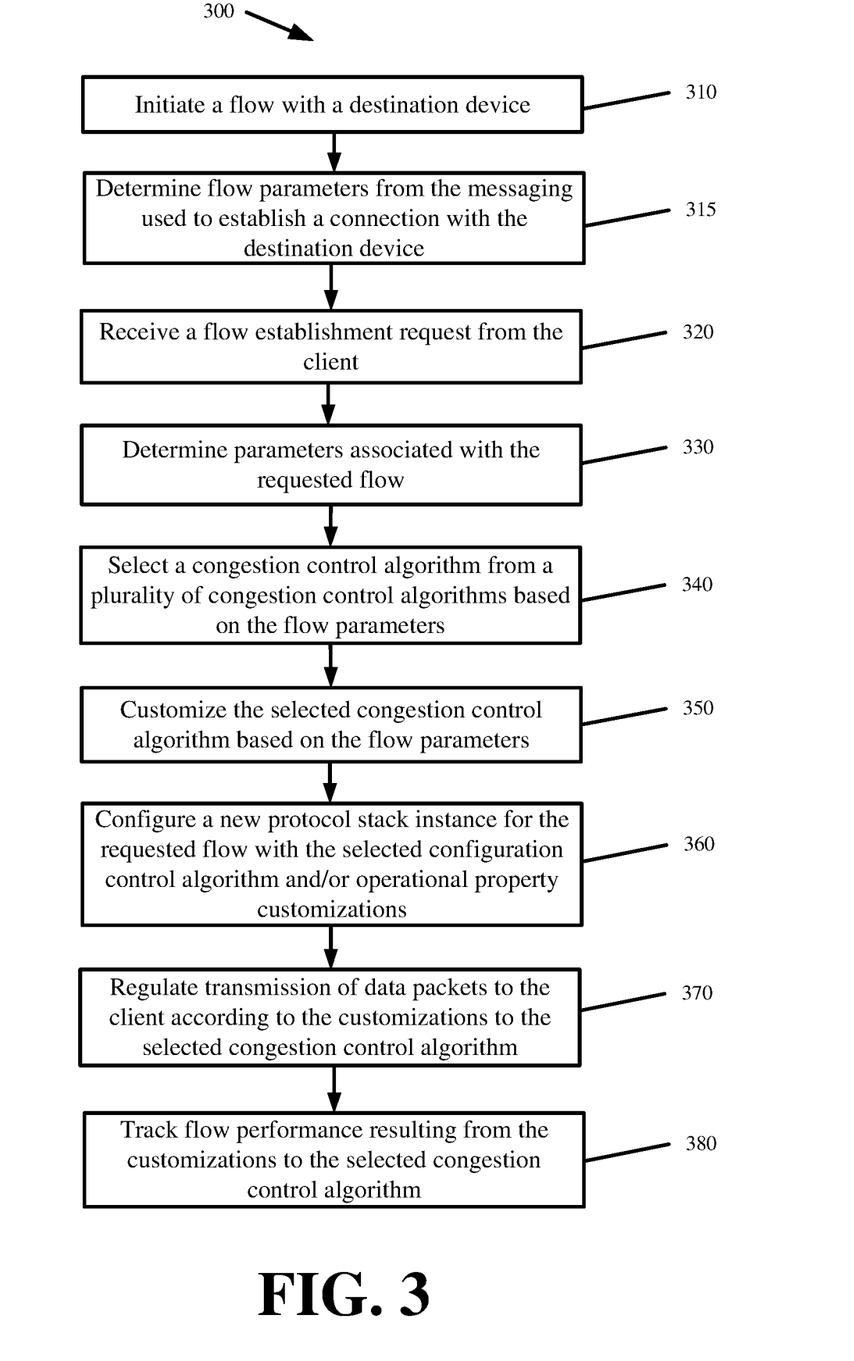
FIG. 3 presents a process for dynamically selecting and customizing congestion control for different active flows in accordance with some embodiments presented herein.

FIG. 3 presents a process 300 for dynamically selecting and customizing congestion control for different active flows in accordance with some embodiments presented herein. Process 300 may be implemented by ACCD 100.

Process 300 may include initiating (at 310) a flow with a destination device by establishing a network connection with the destination device. As noted above, the network connection may be established using any network protocol that supports congestion control and/or flow control. In other words, the network connection may correspond to a physical or logical connection with parameters negotiated between ACCD 100 and the destination device via handshaking or a connection establishment procedure, or may include a virtual connection for a network path or link over which ACCD 100 may send data packets to the destination device.

Process 300 may include determining (at 315) one or more flow parameters from the messaging used to establish (at 310) the connection between ACCD 100 and the destination device. As noted above, the connection establishment messaging may indicate a list of cipher suites that are supported by the destination device. ACCD 100 may derive certain characteristics about the destination device based on the cipher suites that are supported by the destination device. For instance, ACCD 100 may determine age, processing power, type of device, and/or other device characteristics from the from list of supported cipher suites. In some embodiments, ACCD 100 may generate a fingerprint and/or signature of the destination device based on the connection establishment messaging, and may perform a lookup to determine past performance of the destination device and/or identifying characteristics about the destination device using the fingerprint and/or signature. In some embodiments, ACCD 100 may be unable to determine (at 315) flow parameters from the connection establishment messaging, whereas in some other embodiments, the flow parameters determined (at 315) from the connection establishment messaging may be sufficient for ACCD 100 to select (at 340) and/or customize (at 350) congestion control for the flow.

Process 300 may include receiving (at 320) a content request as part of initiating the flow with the destination device. In some embodiments, the flow initiation request may correspond to a request for content, service, or data.

Process 300 may include determining (at 330) flow parameters for the requested flow based on the request messaging. The flow parameters from the request messaging may include identifying information about the destination device, the requested content, service, or data, and/or the network link between ACCD 100 and the destination device. In some embodiments, the flow parameters that are determined (at 330) from the request messaging may supplement the flow parameters that are determined from the connection establishment message. In some other embodiments, ACCD 100 may determine the flow parameters from either the connection establishment messaging or the request messaging.

ACCD 100 may obtain the flow parameters for the destination device from the request header, URL, and/or external sources. For instance, the request header may identify the user agent, the browser or application being used to request the content, the device type, and/or destination device identifying information. Alternatively, ACCD 100 may query one or more external sources, such as subscriber databases of a network carrier, using a network address in the request header to obtain information about the destination device, such as the destination device type, device performance, device resources, device capabilities, location, etc.

ACCD 100 may obtain the flow parameters for the requested content from the URL and/or external sources. For instance, the file extension from the URL may be used to determine the requested content type (e.g., video file, text file, binary file, executable file, JavaScript Object Notation ("JSON") file, and/or other file or content types), and/or the URL domain name, hostname, and/or path may be used to identify the content originator. ACCD 100 may also perform a lookup of the content size by querying ACCD 100 cache with the file name or by issuing a head request to an external source.

ACCD 100 may obtain the flow parameters for the network link based on the messaging used to establish the network connection, the request header, data provided by an external source, and/or by monitoring network performance. For instance, the user agent header field or data provided by an external source may identify the destination device as a wireless device that communicates via an air or wireless interface that is high latency, RTT, and/or low bandwidth. In some embodiments, ACCD 100 may ping different destination devices over different network links to determine performance to the different destination devices over the different network links. For instance, ACCD 100 may ping different address subnets to determine path performance, and may correlate the path performance to the destination device based on the destination device network address. Additionally, ACCD 100 may track network link performance for past flows with different devices, and may retrieve the network link performance upon receiving another request from the same device or a device in a same region or subnet as another device for which ACCD 100 has tracked network link performance.

Process 300 may include selecting (at 340) a particular congestion control algorithm from a plurality of available congestion control algorithms based on the flow parameters. Each congestion control algorithm may respond differently to detected congestion or no congestion on a network link, and may decrease or increase the number of packets and the rate of packets sent from ACCD 100 differently based on the different response behavior of each congestion control algorithm.

ACCD 100 may select (at 340) the particular congestion control algorithm that provides optimal content delivery performance for the flow parameters. ACCD 100 may benchmark or otherwise track content delivery performance for each of the plurality of available congestion control algorithms for different sets of flows.

Benchmarking the content delivery performance may include determining the total time, average latency, and/or content delivery performance metrics associated with transmitting the same content to the same client over the same network link using two or more of the available congestion control algorithms, and determining which congestion control algorithm provides the lowest total time and/or best performance for delivering the content to the client. In some embodiments, ACCD 100 may be configured with the congestion control benchmarks or may store a prioritized list of congestion control algorithms for different sets of flow parameters.

For instance, ACCD 100 may select (at 340) CUBIC congestion control when the requested content has a file size that is less than a threshold, wherein the file size being less than the threshold may result in a total transaction time that is too short for a minimum RTT seeking congestion control algorithm such as BBR. However, if the file size is above the threshold, the destination device's address is within a list of bottom line performing devices, and/or the connection is identified to have high RTT and retransmission counts, then ACCD 100 may select (at 340) BBR congestion control for providing faster performance than CUBIC and other loss-based congestion controls for such flow parameters.

Process 300 may include customizing (at 350) operational properties of the particular congestion control algorithm based on the flow parameters. In some embodiments, the congestion control selection (at 340) and customization (at 350) may be performed after establishing the network connection (at 310) and before receiving (at 320) the content request based on the flow parameters that are determined (at 315) from the connection establishment messaging. This allows ACCD 100 to begin and/or complete the congestion control optimization (e.g., selection and/or customization) earlier so that ACCD 100 may respond sooner to a content request. Specifically, ACCD 100 may begin the congestion control optimization in the time between receiving a connection establishment message and an application layer content request message.

ACCD 100 may customize (at 350) the operational properties to further improve performance of the particular congestion control algorithm for the flow parameters. For instance, ACCD 100 may set the initial window size based on optimal window sizes tracked for different network links, and/or may adjust the scale-back and scale-up rate of the particular congestion control algorithm based on different congestion on different network links. As a specific example, ACCD 100 may determine that the network link associated with the active flow may experience congestion for longer periods of time than other network links, and may customize the operational properties to slow down the rate at which the particular congestion control algorithm increases the window size from a default 30% increase to a more gradual 15% increase. Similarly, ACCD 100 may determine that the network link associated with the active flow may experience a larger spike in congestion than other network links, and may customize the operational properties to more aggressively scale-back the number of outstanding packets upon detecting congestion on the particular network link from a default 50% reduction to a more aggressive 65% reduction.

In some embodiments, ACCD 100 may track different customizations to the operational properties of the particular congestion control algorithm, and the corresponding results of the customizations for flows with different parameters. ACCD 100 may then customize (at 350) the particular congestion control algorithm based on one or more parameters of the requested/active flow that align with parameters for previously tracked customizations that resulted in the lowest overall transmission times relative to other previously tracked customizations.

Process 300 may include configuring (at 360) a new protocol stack instance for the requested flow with the selected configuration control algorithm and/or operational property customizations. In some embodiments, ACCD 100 may support running different instances of a network protocol stack, associating each instance with a different flow, and/or configuring each instance with different congestion control algorithms and/or operational properties. In some such embodiments, ACCD 100 may run a different instance of the configurable network protocol stack for each flow. Accordingly, configuring (at 360) the selected configuration control algorithm and/or operational property customization may include identifying the network socket that is created for the flow, instantiating a new protocol stack instance, connecting the new protocol stack instance to the network socket that is created for the flow, and configuring the new protocol stack instance (e.g., the transport layer of the protocol stack instance) to implement the selected congestion control algorithm with the customized operational properties.

Process 300 may include regulating (at 370) the transmission of data packets for the requested flow according to the customization to the selected particular congestion control algorithm. ACCD 100 may control the number of data packets it sends to the requesting destination device at any given time based on the customized particular congestion control algorithm and real-time state of the network link (e.g., amount of congestion on the network link). In particular, ACCD 100 may increase or decrease the number of data packets it sends at any given time, and the rate of those adjustments based on the customized operational properties of the particular congestion control algorithm and the detected amount of congestion, wherein different operational properties and/or congestion control algorithms produce different amounts of adjustments at different times and/or rates. In some embodiments, congestion on the network link may be determined by a number of lost or unacknowledged packets, the rate at which the destination device acknowledges data packets sent by ACCD 100, the destination device's advertised window, the number of retransmits, latency or ping times for the network link, and/or other signaling or metrics obtained for the network link connecting ACCD 100 to the destination device.

Process 300 may include tracking (at 380) flow performance resulting from the customizations to the selected particular congestion control algorithm. ACCD 100 may track flow performance for machine learning purposes, and to continually adapt the selection and customization of the congestion controls to ensure optimal content delivery performance is provided for each flow.

Figure 4:
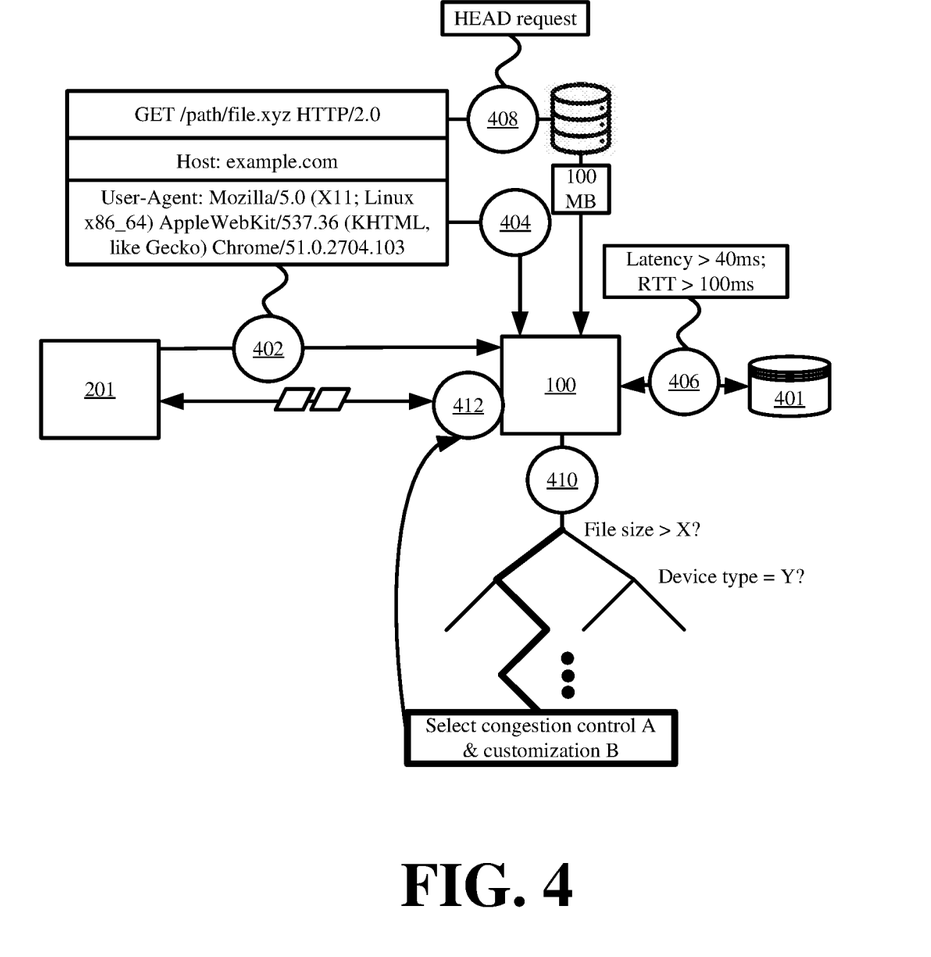
FIG. 4 illustrates an example of selecting and customizing congestion control based on different flow parameters in accordance with some embodiments presented herein.

FIG. 4 illustrates an example of ACCD 100 selecting and customizing congestion control based on different flow parameters in accordance with some embodiments presented herein. ACCD 100 may receive (at 402) a request for content from client device 201.

ACCD 100 may inspect (at 404) the header of the request to determine what type of device is used to issue the request. Additionally, or alternatively, ACCD 100 may obtain information about the network link being used by client device 201 based on the header information.

Additionally, or alternatively, ACCD 100 may perform (at 406) a query to external source 401 based on the header information to determine information about client device 201 and/or the network link that is used to connect to ACCD 100. For instance, ACCD 100 may use the network address or address subnet of client device 201 to determine network performance to other network addresses in the same subnet or previous performance for client device 201. In particular, ACCD 100 may determine if the network address or other unique signature of client device 201 identifies a device in a list of bottom line performance devices, or maps to a device associated with network connectivity and/or network performance (e.g., a wireless device) that are below specified thresholds.

In some embodiments, external source 401 may include another ACCD that operates at a different network location, site, and/or point-of-presence. In some such embodiments, external source 401 may provide performance information for client device 201 and/or congestion control optimizations previously used for client device 201. ACCD 100 may refer to the performance information and/or reapply the congestion control optimizations in order to reduce the congestion control customization for new client devices.

Additionally, or alternatively, ACCD 100 may perform (at 408) a lookup of the requested content to determine the content size. For instance, ACCD 100 may issue an HTTP HEAD request to obtain the content size. ACCD 100 may determine the content type directly from the request URL and/or file extension.

ACCD 100 may perform (at 410) a tree-based traversal using the flow parameters to select an optimal congestion control algorithm and/or operational properties. ACCD 100 may configure the selected congestion control algorithm and/or operational properties for use in regulating the transmission of data packets for the requested flow. Accordingly, ACCD 100 may use the selected optimal congestion control algorithm and/or operational properties to control (at 412) the transmission of data packets between ACCD 100 and client device 201 and/or the data packets for the requested flow.

ACCD 100 may track congestion control performance relative to the set of flow parameters in order to improve future selections and customizations made by ACCD 100, thereby improving content delivery performance for subsequent flows. ACCD 100 may use artificial intelligence and/or machine learning to dynamically alter the congestion control selection and customization for the same set of flow parameters over time.

Figure 5:
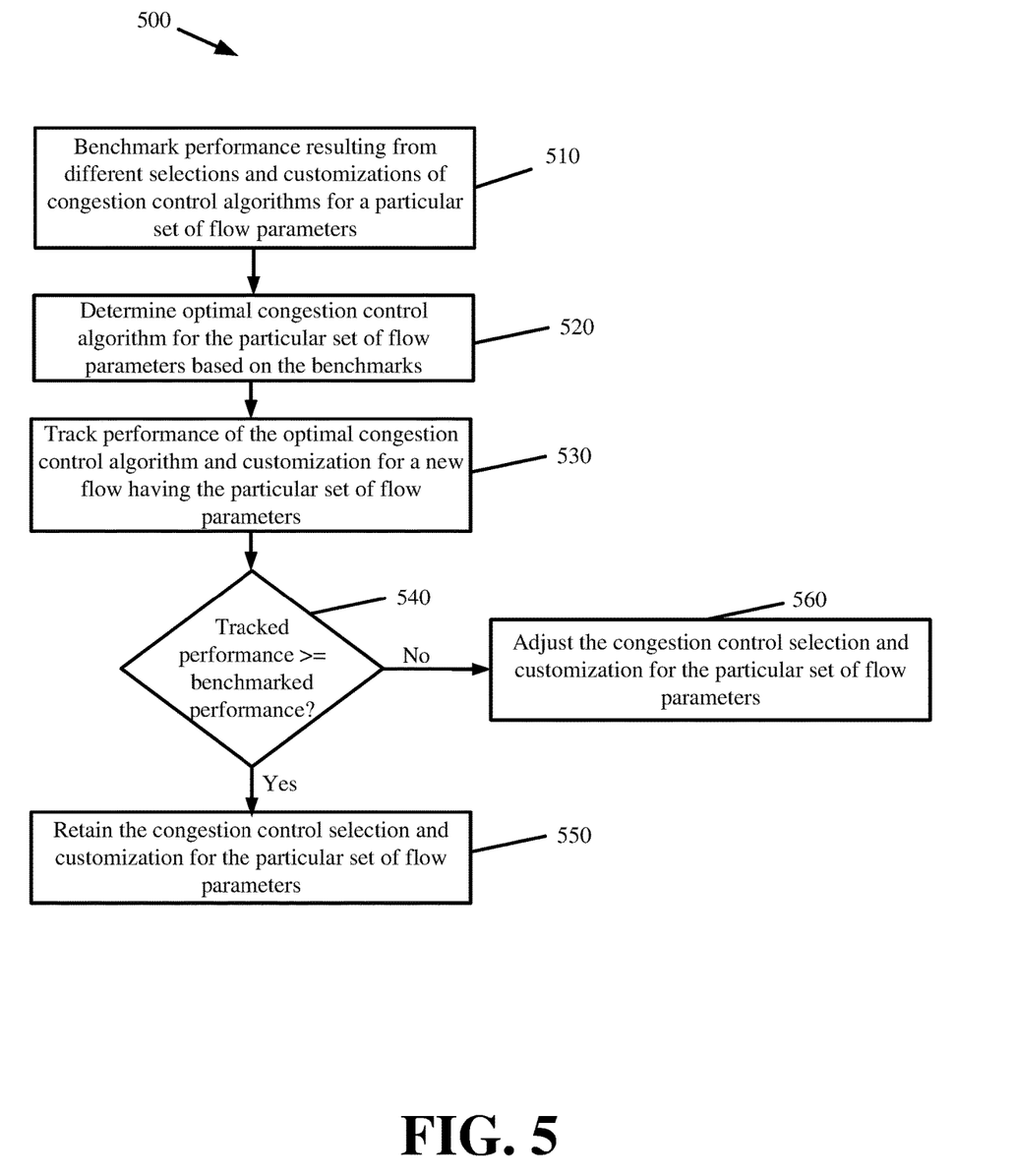
FIG. 5 presents a process for dynamically altering the congestion control selection and customization in accordance with some embodiments presented herein.

FIG. 5 presents a process 500 for dynamically altering the congestion control selection and customization in accordance with some embodiments presented herein. Process 500 may be implemented by ACCD 100.

Process 500 may include benchmarking (at 510) content delivery performance resulting from different selections and customizations of congestion control algorithms for a particular set of flow parameters. Benchmarking (at 510) may include determining the average number of bytes served per unit of time, or the total time to serve a particular number of bytes using each congestion control selection and customization for the particular set of flow parameters and when there are similar amounts of congestion on the network link. In some embodiments, the benchmarking (at 510) may be performed as ACCD 100 responds to different flows having the particular set of flow parameters. In some other embodiments, the benchmarking (at 510) may be derived via network congestion simulations.

Process 500 may include determining (at 520) a selection and customization of a particular congestion control algorithm, from the benchmarked set of congestion control selections and customizations, that provides fastest performance for the particular set of flow parameters (e.g., highest average number of bytes sent per unit of time and/or fastest transmission of a particular number of bytes). In some embodiments, ACCD 100 may link or otherwise tag the selection and customization of the particular congestion control algorithm to the particular set of flow parameters.

Process 500 may include tracking (at 530) performance of the particular congestion control algorithm and customization for a new flow having the particular set of flow parameters. ACCD 100 may track (at 530) latency, RTT, packet loss, packet reordering, number of times ACCD 100 had to scale-back the window size, the optimal window size, etc.

Process 500 may include determining (at 540) if the tracked performance is within a threshold of the benchmarked performance. For instance, ACCD 100 may determine (at 540) if the particular congestion control selection and customization provided an average throughput for the new flow that is within 5% of the average throughput measured during benchmarking of the particular congestion control selection and customization.

Process 500 may include retaining (at 550) the selection and customization of the optimal/particular congestion control algorithm for the particular set of flow parameters in response to determining (at 540—Yes) that the tracked performance exceeded or was within the threshold of the benchmarked performance (e.g., providing equal or better performance than the benchmarked performance). In this case, ACCD 100 may verify that the selection and customization of the particular congestion control algorithm for the particular set of flow parameters continues to provide optimal performance for flows having the particular set of flow parameters.

Process 500 may include adjusting (at 560) the selection and customization of the particular congestion control algorithm for the particular set of flow parameters in response to determining (at 540—No) that the tracked performance is not within the threshold of the benchmarked performance (e.g., providing worse performance than the benchmarked performance). The worse performance may be due to unaccounted for flow parameters, varying levels of congestion on the network link that differ from the congestion when benchmarking (at 510) the performance, different performance by client device 201, and/or different performance by ACCD 100 due to different utilization of these devices.

Adjusting (at 560) the selection and customization may include selecting a different congestion control algorithm to control subsequent flows with the particular set of flow parameters, and/or altering the customization of the operational properties. Based on the tracked (at 530) performance, ACCD 100 may identify a new flow parameter or different flow parameter value that impacts the congestion control performance, and may weigh more heavily or include that new flow parameter or different flow parameter value in the selection and customization of the congestion control algorithm. In some embodiments, ACCD 100 may refer to the benchmarks in order to determine another congestion control algorithm or customization that improves performance relative to the tracked performance. For instance, ACCD 100 may select a first congestion control algorithm for a first flow having the particular set of flow parameters. ACCD 100 may compare tracked performance of a total of 100 MB served over a 10 second interval against benchmarked performance of a total of 120 MB served over the 10 second interval. Based on this comparison, ACCD 100 may determine that the first congestion control algorithm does not provide the expected level of performance, and may select a second congestion control algorithm for a second flow having the particular set of flow parameters, wherein the benchmarks identify the second congestion control algorithm as providing a total of 110 MB served over a 10 second interval for a previous flow having the particular set of flow parameters.

Figure 6:
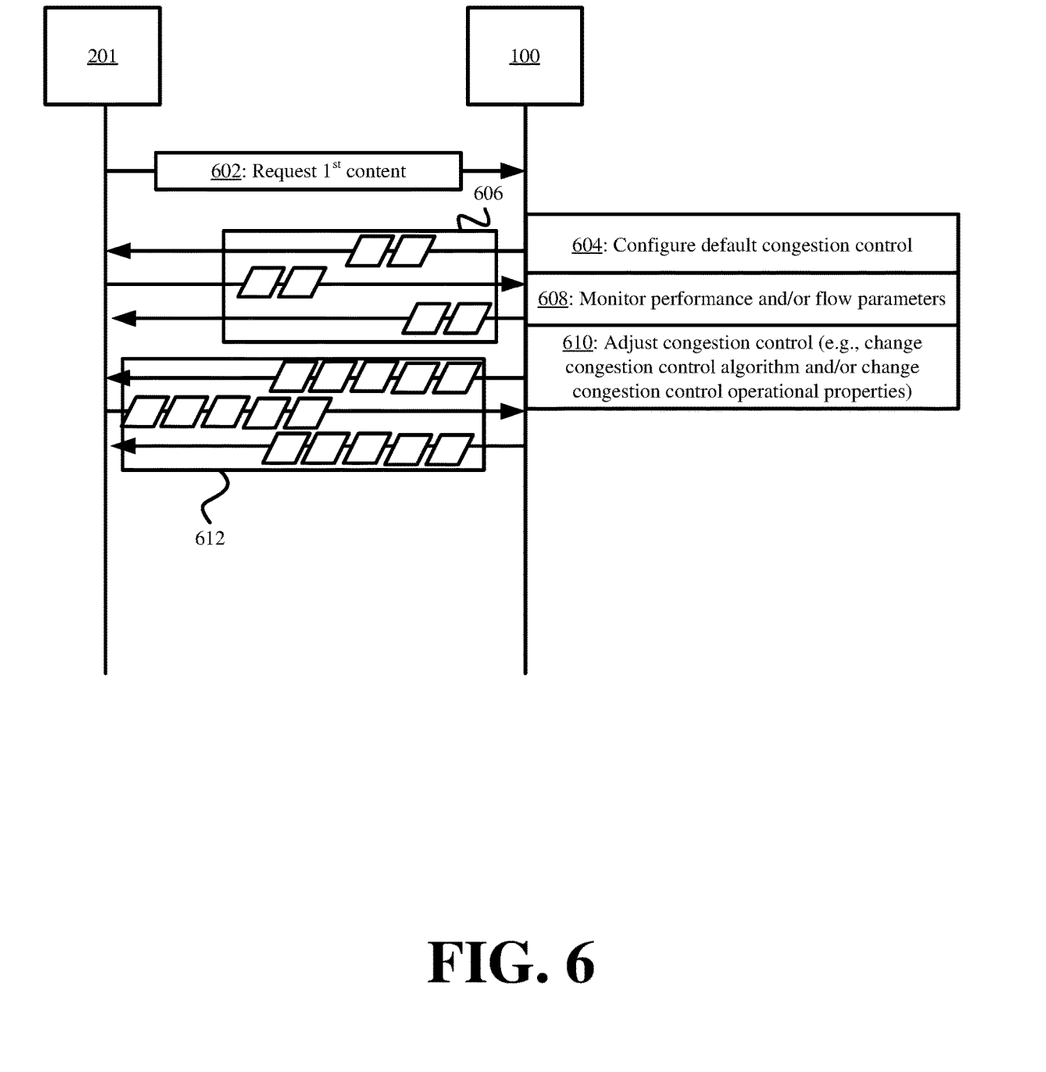
FIG. 6 illustrates an example of dynamically adjusting congestion control for an active flow in accordance with some embodiments presented herein.

In some embodiments, ACCD 100 may dynamically change the congestion control algorithm and/or operational properties for an active flow in response to changing flow parameters or new parameters that are not available when initiating a flow. FIG. 6 illustrates an example of dynamically adjusting congestion control for an active flow in accordance with some embodiments presented herein.

ACCD 100 may receive (at 602) a request for initiating a new flow from client device 201. ACCD 100 may determine that there is insufficient data from which to select an optimal congestion control algorithm and/or set optimal operational properties for the new flow, and may configure (at 604) a default congestion control for the new flow. The default congestion control may include configuring a default congestion control algorithm with default operational properties at a first time. Alternatively, ACCD 100 may obtain a first set of flow parameters for the flow at the first time, and may configure (at 604) a first congestion control algorithm with a first set of operational properties at the first time.

ACCD 100 may regulate (at 606) the transmission of a first set of packets for the new flow according to the default congestion control, and may monitor (at 608) the flow. ACCD 100 may monitor (at 608) flow performance when using the default congestion control. Additionally, and/or alternatively, ACCD 100 may monitor the flow parameters in order to identify any changes to the flow parameters and/or new flow parameters that may affect the congestion control operation.

ACCD 100 may adjust (at 610) the congestion control at a second time after transmission of the first set of packets and before transmission of a second set of packets for the new flow in response to monitoring (at 608) the flow and determining that the congestion control adjustments may improve performance (e.g., lower RTT, reduce the number of times that the window size is scaled back, etc.). In some embodiments, adjusting (at 610) the congestion control may include selecting a congestion control algorithm other than the default congestion control algorithm to regulate the remaining transmission of the flow packets. In some embodiments, adjusting (at 610) the congestion control may include modifying the operational properties of the default congestion control algorithm or the selected congestion control algorithm to optimize the congestion control for the current flow parameters. For instance, ACCD 100 may configure the default congestion control in response to a first set of flow parameters, may detect that congestion has increased over the network link during transmission of the first set of packets, and may adjust (at 610) the congestion control to modify operational properties of the congestion control algorithm based on the increased congestion.

ACCD 100 may regulate (at 612) the transmission of the second set of packets for the flow using the adjusted congestion control. ACCD 100 may continue to monitor the flow, and may further adjust the congestion control in order to turn performance as the flow parameters continue to change.

Figure 7:
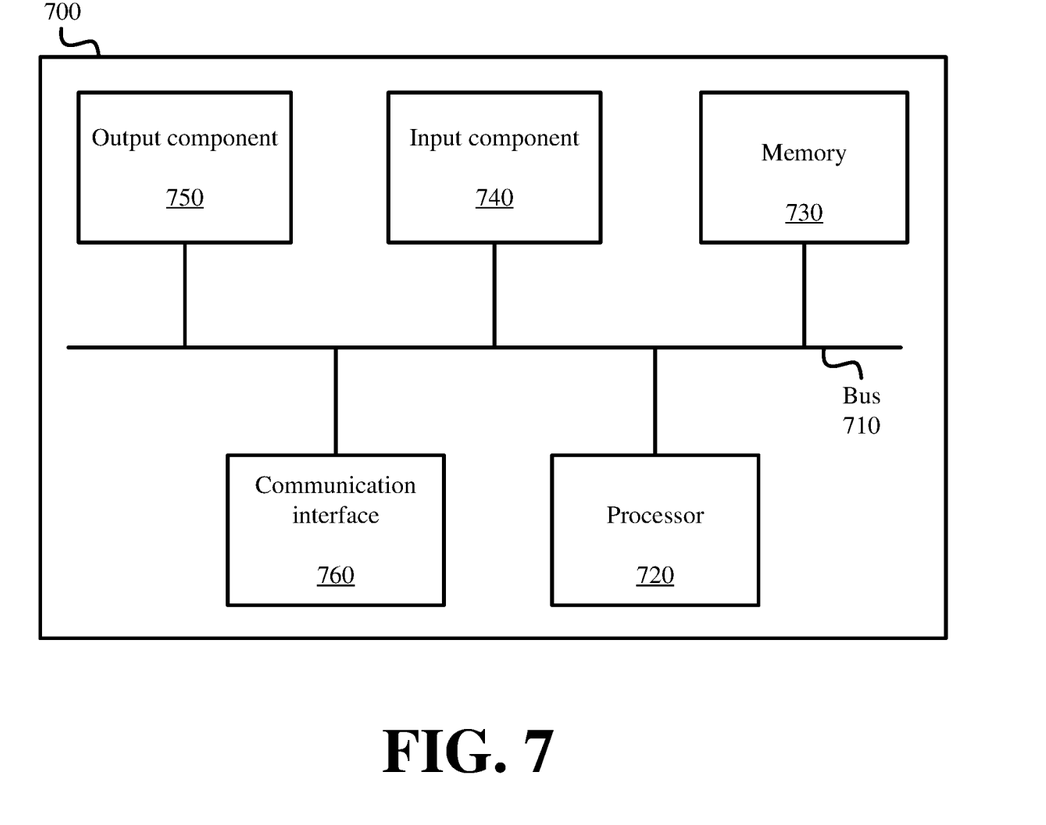
FIG. 7 illustrates example components of one or more devices, according to one or more embodiments described herein.

FIG. 7 is a diagram of example components of device 700. Device 700 may be used to implement one or more of the devices or systems described above (e.g., ACCD 100, client device 201, etc.). Device 700 may include bus 710, processor 720, memory 730, input component 740, output component 750, and communication interface 760. In another implementation, device 700 may include additional, fewer, different, or differently arranged components.

Bus 710 may include one or more communication paths that permit communication among the components of device 700. Processor 720 may include a processor, microprocessor, or processing logic that may interpret and execute instructions. Memory 730 may include any type of dynamic storage device that may store information and instructions for execution by processor 720, and/or any type of non-volatile storage device that may store information for use by processor 720.

Input component 740 may include a mechanism that permits an operator to input information to device 700, such as a keyboard, a keypad, a button, a switch, etc. Output component 750 may include a mechanism that outputs information to the operator, such as a display, a speaker, one or more light emitting diodes ("LEDs"), etc.

Communication interface 760 may include any transceiver-like mechanism that enables device 700 to communicate with other devices and/or systems. For example, communication interface 760 may include an Ethernet interface, an optical interface, a coaxial interface, or the like. Communication interface 760 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 700 may include more than one communication interface 760. For instance, device 700 may include an optical interface and an Ethernet interface.

Device 700 may perform certain operations relating to one or more processes described above. Device 700 may perform these operations in response to processor 720 executing software instructions stored in a computer-readable medium, such as memory 730. A computer-readable medium may be defined as a non-transitory memory device. A memory device may include space within a single physical memory device or spread across multiple physical memory devices. The software instructions may be read into memory 730 from another computer-readable medium or from another device. The software instructions stored in memory 730 may cause processor 720 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
    tracking different performance with which a plurality of congestion control algorithms regulate a transfer of packets associated with a plurality of flows having a common first set of flow parameters;
    initiating a first flow that is associated with the first set of flow parameters, and a second flow that is associated with a different second set of flow parameters at an adaptive congestion control device (ACCD);
    selecting a first congestion control algorithm from the plurality of congestion control algorithms based on the first set of flow parameters associated with the first flow and determining, from said tracking, that a performance of the first congestion control algorithm is faster than a performance of other congestion control algorithms of the plurality of congestion control algorithms for the plurality of flows having the first set of flow parameters;
    controlling a transmission of packets for the first flow from the ACCD according to the first congestion control algorithm;
    selecting a different second congestion control algorithm from the plurality of congestion control algorithms based on the second set of flow parameters; and
    controlling a transmission of packets for the second flow from the ACCD according to the second congestion control algorithm.

2. The method of claim 1 further comprising:
    determining the first set of flow parameters from parameters of a first client device requesting the first flow;
    determining the second set of flow parameters from parameters of a different second client device requesting the second flow;
    wherein controlling the transmission of the packets for the first flow comprises providing the packets of the first flow from the ACCD to the first client device at a first rate regulated by the first congestion control algorithm; and
    wherein controlling the transmission of the packets for the second flow comprises providing the packets of the second flow from the ACCD to the second client device at a second rate regulated by the second congestion control algorithm.

3. The method of claim 1 further comprising:
    determining the first set of flow parameters from parameters of first content requested as part of the first flow;
    determining the second set of flow parameters from parameters of different second content requested as part of the second flow;
    wherein controlling the transmission of the packets for the first flow comprises providing the packets of the first content from the ACCD at a first rate regulated by the first congestion control algorithm; and
    wherein controlling the transmission of the packets for the second flow comprises providing the packets of the second content from the ACCD at a second rate regulated by the second congestion control algorithm.

4. The method of claim 1 further comprising:
    determining the first set of flow parameters from parameters of a first network link between the ACCD and a first client device;
    determining the second set of flow parameters from parameters of a different second link between the ACCD and a second client device;
    wherein controlling the transmission of the packets for the first flow comprises providing the packets of the first flow from the ACCD to the first client device over the first network link at a first rate regulated by the first congestion control algorithm; and
    wherein controlling the transmission of the packets for the second flow comprises providing the packets for the second flow from the ACCD to the second client device over the second network link at a second rate regulated by the second congestion control algorithm.

5. The method of claim 1 further comprising:
determining the first set of flow parameters from a header of a first request used as part of initiating the first flow; and
determining the second set of flow parameters from a header of a second request used as part of initiating the second flow.

6. The method of claim 1,
wherein selecting the second congestion control algorithm comprises determining that the second congestion control algorithm provides faster content delivery performance than other congestion control algorithms of the plurality of congestion control algorithms for flows with the second set of flow parameters.

7. The method of claim 1,
wherein controlling the transmission of the packets for the first flow comprises transmitting the first flow with a first number of unacknowledged packets corresponding to a first window size of the first congestion control algorithm; and
wherein controlling the transmission of the packets for the second flow comprises transmitting the second flow with a different second number of unacknowledged packets corresponding to a different second window size of the second congestion control algorithm.

8. The method of claim 1,
wherein controlling the transmission of the packets for the first flow comprises reducing a window size of the first congestion control algorithm by a first amount in response to congestion; and
wherein controlling the transmission of the packets for the second flow comprises reducing a window size of the second congestion control algorithm by a different second amount in response to the same congestion.

9. The method of claim 1,
wherein controlling the transmission of the packets for the first flow comprises regulating output of the packets for the first flow by a first amount that is set and adjusted by the first congestion control algorithm; and
wherein controlling the transmission of the packets for the second flow comprises regulating output of the packets for the second flow by a different second amount that is set and adjusted by the second congestion control algorithm.

10. The method of claim 1 further comprising:
customizing the first congestion control algorithm with a first set of operational properties in response to the first set of flow parameters having first values;
customizing the first congestion control algorithm with a different second set of operational properties in response to the first set of flow parameters having second values; and
wherein the second set of operational properties change operation of the first congestion control algorithm relative to the first set of operational properties.

11. The method of claim 1,
wherein the first congestion control algorithm corresponds to a loss-based congestion control implementation; and
wherein the second congestion control algorithm corresponds to a delay-based congestion control implementation.

12. The method of claim 1,
wherein the first congestion control algorithm corresponds to a Bottleneck Bandwidth and Round-trip propagation time (BBR) congestion control; and
wherein the second congestion control algorithm correspond to a Transmission Control Protocol (TCP) congestion control implementation other than BBR congestion control.

13. The method of claim 1,
wherein selecting the first congestion control algorithm comprises:
determining that a size of first content requested as part of the first flow is less than a threshold size;
determining that the first congestion control algorithm provides faster content delivery performance than the second congestion control algorithm for content that is less than the threshold size; and
wherein selecting the second congestion control algorithm comprises:
determining that a size of second content requested as part of the second flow is greater than the threshold size;
determining that the second congestion control algorithm provides faster content delivery performance than the first congestion control algorithm for content that is greater than the threshold size.

14. The method of claim 1,
wherein selecting the first congestion control algorithm comprises:
determining that a round-trip time (RTT) for a first network link traversed as part of the first flow is less than a threshold RTT;
determining that the first congestion control algorithm provides faster content delivery performance than the second congestion control algorithm for network links with RTTs less than the threshold RTT; and
wherein selecting the second congestion control algorithm comprises:
determining that a RTT for a second network link traversed as part of the second flow is greater than the threshold RTT;
determining that the second congestion control algorithm provides faster content delivery performance than the first congestion control algorithm for network links with RTTs greater than the threshold RTT.

15. The method of claim 1, wherein tracking the different performance comprises:
benchmarking a performance associated with regulating the transfer of packets for one or more of the plurality of flows with the first congestion control algorithm.

16. The method of claim 15 further comprising:
determining that the transmission of a first set of packets for the first flow from the ACCD according to the first congestion control algorithm is not within a threshold of the performance that is benchmarked for the first congestion control algorithm; and
wherein controlling the transmission of the packets for the first flow comprises regulating transmission of the first set of packets for the first flow from the ACCD according to the first congestion control algorithm, and regulating transmission of a subsequent second set of packets for the first flow from the ACCD according a third congestion control algorithm of the plurality of congestion control algorithms in response to determining that the transmission of the first set of packets for the first flow from the ACCD according to the first congestion control algorithm is not within the threshold of the performance that is benchmarked for the first congestion control algorithm.

17. The method of claim 15 further comprising:

determining that the transmission of packets for the first flow from the ACCD according to the first congestion control algorithm is not within a threshold of the performance that is benchmarked for the first congestion control algorithm; and changing operational properties of the first congestion control algorithm while the first flow is active in response to determining that the transmission of packets for the first flow from the ACCD according to the first congestion control algorithm is not within the threshold of the performance that is benchmarked for the first congestion control algorithm, wherein changing the operational properties comprises dynamically changing one or more of a window size or a rate at which the window size changes while controlling the transmission of packets for the first flow.

18. The method of claim 15 further comprising:

determining that the transmission of packets for the first flow from the ACCD according to the first congestion control algorithm is not within a threshold of the performance that is benchmarked for the first congestion control algorithm; and switching from the first congestion control algorithm to a third congestion control algorithm of the plurality of congestion control algorithms while the first flow is active in response to determining that the transmission of packets for the first flow from the ACCD according to the first congestion control algorithm is not within the threshold of the performance that is benchmarked for the first congestion control algorithm.

19. A device comprising:

one or more processors configured to:
   track different performance with which a plurality of congestion control algorithms regulate a transfer of packets associated with a plurality of flows having a common first set of flow parameters;
   initiate a first flow that is associated with the first set of flow parameters, and a second flow that is associated with a different second set of flow parameters;
   select a first congestion control algorithm from the plurality of congestion control algorithms based on the first set of flow parameters associated with the first flow and determining, from said tracking, that a performance of the first congestion control algorithm is faster than a performance of other congestion control algorithms of the plurality of congestion control algorithms for the plurality of flows having the first set of flow parameters;
   control a transmission of packets for the first flow according to the first congestion control algorithm;
   select a different second congestion control algorithm from the plurality of congestion control algorithms based on the second set of flow parameters; and
   control a transmission of packets for the second flow according to the second congestion control algorithm.

20. A non-transitory computer-readable medium, storing a plurality of processor-executable instructions to:

track different performance with which a plurality of congestion control algorithms regulate a transfer of packets associated with a plurality of flows having a common first set of flow parameters;

initiate a first flow that is associated with the first set of flow parameters, and a second flow that is associated with a different second set of flow parameters;

select a first congestion control algorithm from the plurality of congestion control algorithms based on the first set of flow parameters associated with the first flow and determining, from said tracking, that a performance of the first congestion control algorithm is faster than a performance of other congestion control algorithms of the plurality of congestion control algorithms for the plurality of flows having the first set of flow parameters;

control a transmission of packets for the first flow according to the first congestion control algorithm;

select a different second congestion control algorithm from the plurality of congestion control algorithms based on the second set of flow parameters; and control a transmission of packets for the second flow according to the second congestion control algorithm.

* * * * *